United States Patent
Evans et al.

(10) Patent No.: US 9,245,116 B2
(45) Date of Patent: Jan. 26, 2016

(54) SYSTEMS AND METHODS FOR REMOTE MONITORING, SECURITY, DIAGNOSTICS, AND PROGNOSTICS

(71) Applicant: General Electric Company, Schenectady, NY (US)

(72) Inventors: Scott Charles Evans, Burnt Hills, NY (US); Richard Brownell Arthur, Niskayuna, NY (US); Bouchra Bouqata, Niskayuna, NY (US); Piyush Mishra, Niskayuna, NY (US); Weizhong Yan, Clifton Park, NY (US); Anil Varma, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 105 days.

(21) Appl. No.: 13/848,354

(22) Filed: Mar. 21, 2013

(65) Prior Publication Data
US 2014/0289852 A1    Sep. 25, 2014

(51) Int. Cl.
*G06F 21/55* (2013.01)

(52) U.S. Cl.
CPC ........................................ *G06F 21/55* (2013.01)

(58) Field of Classification Search
CPC ......... G06F 21/56; G06F 21/55; G06F 21/57; H04L 63/145
See application file for complete search history.

(56) References Cited

U.S. PATENT DOCUMENTS

| | | | |
|---|---|---|---|
| 7,409,716 B2 | 8/2008 | Barnett | |
| 7,581,434 B1 * | 9/2009 | Discenzo et al. | 73/53.01 |
| 7,720,013 B1 | 5/2010 | Kelliher | |
| 8,245,301 B2 | 8/2012 | Evans | |
| 8,245,302 B2 | 8/2012 | Evans | |
| 8,312,542 B2 | 11/2012 | Eiland | |
| 8,327,443 B2 | 12/2012 | Eiland | |
| 8,683,563 B1 * | 3/2014 | van Dijk et al. | 726/6 |
| 2007/0271610 A1 * | 11/2007 | Grobman | 726/22 |
| 2009/0327637 A1 * | 12/2009 | Chouery | 711/163 |
| 2010/0169970 A1 * | 7/2010 | Stolfo et al. | 726/22 |

OTHER PUBLICATIONS

In-Execution Malware Detection using Task Structures of Linux Processes; Farrukh Shahzad (nexGIN RC), National University of Computer & Emerging Sciences, Islamabad, 44000, Pakistan, 2011.

* cited by examiner

*Primary Examiner* — Chau Le
*Assistant Examiner* — Muhammad Chaudhry
(74) *Attorney, Agent, or Firm* — Melissa K. Dobson (57) ABSTRACT

A system includes a physical analysis module, a cyber analysis module, and a determination module. The physical analysis module is configured to obtain physical diagnostic information, and to determine physical analysis information using the physical diagnostic information. The cyber analysis module is configured to obtain cyber security data of the functional system, and to determine cyber analysis information using the cyber security data. The determination module is configured to obtain the physical analysis information and the cyber analysis information, and to determine a state of the functional system using the physical analysis information and the cyber analysis information. The state determined corresponds to at least one of physical condition or cyber security threat. The determination module is also configured to identify if the state corresponds to one or more of a non-malicious condition or a malicious condition.

6 Claims, 5 Drawing Sheets

FIG. 5

SYSTEMS AND METHODS FOR REMOTE MONITORING, SECURITY, DIAGNOSTICS, AND PROGNOSTICS

BACKGROUND

Complex systems may utilize both physical components configured to provide work (e.g., energy, movement, or the like) along with networking or information systems that may exchange information with external systems. The physical systems may be subject to wear and tear or other damage, while the information systems may be subject to cyber attack, such as from viruses or other malware.

For tactical platforms or critical infrastructure, cyber threats may be particularly difficult to address due to the mission critical and time sensitive nature of such platforms or infrastructure. Damage to, compromise of, or loss of use of such resources provides disproportionate harm. Conventional techniques often fail to detect complex cyber threats, and/or lack flexibility to be useful in a variety of contexts. As one example, conventional techniques may fail to detect a cyber threat that mimics a physical component or aspect of a system. The inability of conventional systems to accurately and reliably identify malicious (e.g., due to cyber attack) as well as non-malicious (e.g., due to wear and tear of physical components) leads to increased damage to systems being monitored as well as increased down time of such systems. The potential for damage from malicious attacks is exacerbated by the increasing use of networking by systems utilizing information systems, for example.

BRIEF DESCRIPTION

In one embodiment, a system is provided including a physical analysis module, a cyber analysis module, and a determination module. The physical analysis module is configured to obtain, via one or more sensors, physical diagnostic information describing at least one of an operational or environmental state of a functional system, and to determine physical analysis information using the physical diagnostic information. The cyber analysis module is configured to obtain cyber security data corresponding to a networking portion of the functional system, and to determine cyber analysis information using the cyber security data. The determination module is configured to obtain the physical analysis information and the cyber analysis information, and to determine a state of the functional system using the physical analysis information and the cyber analysis information. The state corresponds to at least one of physical condition or cyber security threat. The determination module is also configured to identify if the state corresponds to one or more of a non-malicious condition or a malicious condition.

In another embodiment, a method is provided including obtaining, via one or more sensors, physical diagnostic information describing at least one of an operational or environmental state of a functional system. The method also includes obtaining cyber security data corresponding to a networking portion of the functional system. Further, the method includes obtaining, at a processing module, the physical diagnostic information and the cyber security data. Additionally, the method includes determining, at the processing module, a state of the functional system using the physical diagnostic information and the cyber security data, with the state corresponding to at least one of physical condition or cyber security threat. Also, the method includes identifying, at the processing module, if the state corresponds to one or more of a non-malicious condition or a malicious condition.

In another embodiment, a method is provided that includes obtaining, at a processing module, the cyber security data. The method also includes determining, at the processing module, a state of the functional system, the state corresponding to a cyber security threat. Further, the method includes determining, at the processing module, an expected life for the functional system using at least a portion of the cyber security data, the expected life corresponding to a predicted time for which the functional system is expected to be free from faults due to previous exposure to cyber attack.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for the integration of monitoring, security, and prognostics used in conjunction with systems being analyzed. The systems being analyzed may be complex information systems and/or cloud-based systems. Various embodiments provide for the use of machine learning to develop models for monitoring the health of a system, monitoring attacks on the system (e.g., cyber attacks), and/or project or estimate a remaining life of the system based on one or more of the health of the system or attacks on the system. Various embodiments discern, identify, and/or characterize both malicious and non-malicious faults, anomalies and/or degradation to improve availability and/or quality of service, operation, performance, and/or reliability of the system being analyzed or monitored.

Various embodiments utilize, among other things, parameters or information conventionally analyzed separately in isolation. For example, various embodiments analyze information previously considered by physical health monitoring (PHM) systems, as well as information previously considered by information security (such as intrusion detection systems (IDS), intrusion protection systems (IPS), antivirus systems, or the like). Yet further still, various embodiments also analyze information previously considered in isolation by remote monitoring and diagnostic (RM&D) systems. Various modeling techniques, such as machine learning, ensemble techniques, fusion techniques, or the like are employed in various embodiments to provide improved analytics. Various embodiments detect failure or anomaly modes with greater accuracy via the use of information regarding security and health monitoring in conjunction with each other. Various embodiments also identify with greater accuracy whether a failure or anomaly is malicious or non-malicious in nature.

Various embodiments provide for the analysis of cyber health and/or cyber security (or information security) as an integrated aspect of monitoring of physical systems and/or components. In various embodiments, malicious attacks are analyzed as a subset of faults incurred by information systems. Further, various embodiments provide for cyber-security prognostics to help assess the cyber-security of a system and/or assess remaining secure life of a system. Various embodiments provide for new techniques for detecting malicious breaches, for example using parameters conventionally associated with the assessment of a physical health of a system in conjunction with cyber security data to assess malicious breaches and/or the security of a system.

At least one technical effect of various embodiments is improved detection of faults and/or monitoring of the security and/or physical health of a system. At least one technical effect of various embodiments includes improved detection of malicious attacks. At least one technical effect of various embodiments includes improved characterization of faults as malicious or non-malicious. At least one technical effect of various embodiments includes improved prognostics of functional systems. At least one technical effect of various embodiments is the provision of a remaining secure life estimate or projection providing prognostics in terms of cyber security. At least one technical effect of various embodiments is improved response to present cyber threats and/or improved prevention of future cyber threats.

Figure 1:
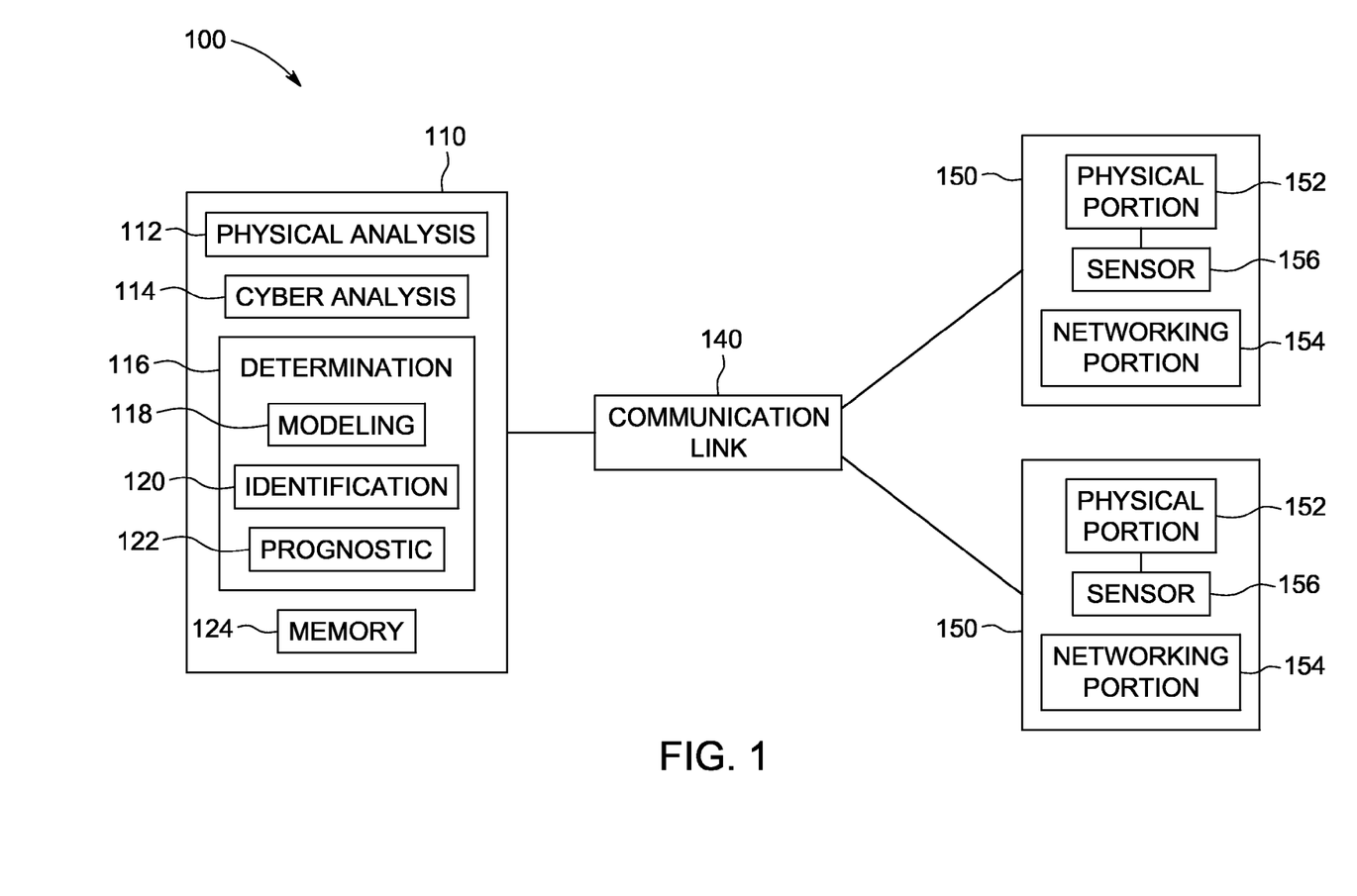
FIG. 1 is a schematic block diagram of a system for remote monitoring, security, and prognostics in accordance with various embodiments.

FIG. 1 is a schematic block diagram of a system 100 formed in accordance with an embodiment. Generally, in various embodiments, the system 100 is configured to identify a current state or states of a functional system, to detect or determine a cyber or information security state or level of the functional system, and/or to predict or project an estimated life of the functional system. The embodiment depicted in FIG. 1 is configured to use both physical information (e.g., information describing one or more physical operative and/or environmental conditions of a functional system or aspect or component thereof), as well as information relating to cyber or information security of one or more networking portions of the functional system, to determine a present state or condition of the functional system and/or to estimate or otherwise determine a projected life of the functional system. Use of such multiple types of information provides an improved understanding of the overall state of the functional system. For example, the current state of a functional system may be determined using one or more models that utilize both physical (or operational) and cyber security parameters as inputs to a model or models used to determine the state. Additionally or alternatively, a projected life of a functional system may be estimated or projected using one or more models that utilize both physical and cyber security parameters as inputs to a model or models used to determine the state. In various embodiments, one or more models (or aspects thereof) may be designed, developed, or modified via the use of machine learning. Various embodiments provide for improved identification of a state of a system, improved characterization of detected faults as malicious or benign, and/or improved prognostics that, for example, provide for an estimation of remaining secure life with respect to threats from cyber attack additionally or alternatively to remaining useful life based on conditions of physical components. As used herein, a malicious fault may be understood as a fault relating to an attack on a computer system or network initiated or designed by an outside source. For example, a virus or other malware may be understood as a malicious fault. A benign or non-malicious fault may be understood as a fault not occurring due to an attack on a computer system, but instead occurring, for example, due to normal wear and tear or the failure of a physical component. Examples of benign or non-malicious fault include bearing wear, failure of a physical component, cracking of a structural member, seizing of a bearing, failure of a seal resulting in leakage and/or an inappropriate pressure, blockage of a fuel line, or the like.

For the embodiment depicted in FIG. 1, the system 100 includes a monitoring module 110, a communication link 140, and plural functional systems 150. In alternate embodiments, only one functional system 150 may be present, while in other embodiments, additional functional systems 150 may be present. The functional system 150 may be understood as a system configured to perform one or more useful or productive tasks, and the monitoring module 110 is configured to monitor the state or condition of the functional system 150, to identify cyber threats to the functional system 150, and to estimate or determine a projected life of the functional system 150. The communication link 140 is configured to provide one or more paths of communication between the functional systems 150 and the monitoring module 110.

As depicted in FIG. 1, the system 100 includes two functional systems 150. Other numbers of functional systems may be present in various embodiments. In some embodiments, the functional systems 150 communicatively coupled to the monitoring module 110 may be substantially similar, while in other embodiments, substantially different functional systems 150 may be communicatively coupled to the monitoring module 110. Additionally or alternatively, more than monitoring module 110 may be communicatively coupled to a given functional system 150. The monitoring module 110 in various embodiments may be operated, administered, or utilized by one or more of an owner or operator of the functional system 150; a vendor, manufacturer, distributor, or other provider of the functional system 150; or a service provider engaged in the maintenance of the functional system 150.

Generally, the functional system 150 is configured to perform a useful or productive task. Functional systems 150 may be used for a variety of tasks and/or in a variety of industries. By way of example, functional systems 150 may be utilized in energy, aviation, oil and gas, healthcare, rail transport, or the like. Further still, in various embodiments, a given functional system 150 may include an individual device or facility, a component or system of a device or facility, and/or a group or fleet of devices or facilities. By way of example, a given functional system 150 may include an aircraft, one or more engines of an aircraft, or a fleet of aircraft. The system 100 may include a plurality of such functional systems. Examples of functional systems associated with aviation include aircraft, aircraft engines, and components or aspects thereof. Examples of functional systems associated with energy include turbines, engines, motors, control systems, power plants, transformers, cooling towers, and components or aspects thereof. Examples of functional systems in healthcare include imaging devices, servers, workstations, and components or aspects thereof. Examples of functional systems in rail transportation include battery management systems, locomotives, wayside devices, and components or aspects thereof. A given functional system 150, for example, may include one or more programmable logic controllers (PLCs) for controlling one or more aspects of the given functional system 150.

As shown in FIG. 1, the functional system 150 includes a physical portion 152 and a networking portion 154. It should be noted that the depiction of the functional system 150 is intended as schematic in nature and for illustrative purposes only. For example, a given component, sub-system, or aspect of the functional system 150 may have both a physical portion 152 and a networking portion 154 dedicated thereto or otherwise associated therewith. In various embodiments, plural physical portions 152 and/or networking portions 154 may be present in various functional systems 150. The physical portion 152 may in turn be comprised of plural sub-portions or subsystems. In the illustrated embodiment, the functional system 150 also includes a sensor 156 operably connected to the physical portion. The sensor 156 may be configured to sense or detect a parameter corresponding to an operational state of the functional system, such as a velocity or force associated with the operation of the physical portion 152. Alternatively or additionally, the sensor 156 may be configured to sense or detect a parameter corresponding to an environmental state of the functional system, such as temperature or humidity corresponding to an environmental condition of the physical portion 152. More than one sensor 156 may be employed in various embodiments. For example, in some embodiments, the physical portion 152 may be an aircraft engine. A number of sensors 156 may be associated with the aircraft engine to sense or detect operational and/or environmental parameters associated with the aircraft engine. The sensor 156 may provide information regarding the detection or sensing performed by the sensor 156 to the monitoring module 110. Such information may be provided in a raw form (e.g., as detected or sensed by the sensor 156) and/or pre-processed.

The networking portion 154 of the functional system 150 is configured to communicate with outside systems or entities. Such communication may be accomplished through wired connections and/or wireless connections. As one example, the networking portion 154 may receive information from and/or provide information to a separate system or entity over a network such as the interne. As another example, the networking portion 154 may share information via a cloud arrangement. As still another example, the network portion 154 may share information via media storage devices, such as hard drives, thumb drives, or the like. The networking portion 154 in the illustrated embodiment is configured to communicate cyber security data to the monitoring module 110. The cyber security data may be in the form of one or more of raw data, meta data, programs, logs or the like. Additionally or alternatively, the cyber security data may provide, for example, results of a security scan performed by the networking portion 154 and/or another aspect of the functional system 150. Thus, the cyber security data communicated to the monitoring module 110 may include results of a performed identification of a cyber security breach (or potential breach) and/or raw data or information from which a security breach or compromise of cyber security may be ascertained. The networking portion 154 may include ports for communicating with other systems or entities. Such ports may include network connections or aspects thereof, USB ports (e.g., for accepting a thumb drive), or the like.

In the illustrated embodiment, the communication link 140 is configured to provide one or more paths of communication between the functional systems 150 and the monitoring module. In some embodiments, the communication link 140 may be configured as a cloud arrangement. In various embodiments, the communication link 140 may be configured as a private network or cloud arrangement with limited access, or may be configured as a public network or cloud. Further, the communication link 140 may provide communication between one or more functional systems 150 and one or more additional functional systems 150 and/or outside (e.g., external to system 100) entities and/or systems (not shown). In various embodiments, the health and/or security of the communication link 140 may also be monitored and/or analyzed by the monitoring module 110.

The monitoring module 110 in the depicted embodiment is configured to obtain the physical diagnostic information and cyber security data from the functional system 150, determine a state of the functional system 150 using the physical diagnostic information and the cyber security data, and identify if the state corresponds to one or more of a non-malicious or malicious condition. In various embodiments, the monitoring module 110 may also be configured to determine an expected life for the functional system 150 using information obtained from the functional system 150. The state of the functional system 150 (and/or a projected or estimated life of the functional system 150) may be determined, for example, using one or models based on historical information corresponding to the physical diagnostic information and/or the cyber security data. Such models, for example, may be determined, developed, or otherwise constructed using machine learning techniques.

The monitoring module 110 (and/or various modules or sub-modules of the monitoring module 110) may be understood in various embodiments as a processing module. The monitoring module 110 may be configured as one or more computer processors or other logic-based devices that perform operations based on one or more sets of instructions (e.g., software). The instructions on which the monitoring module 110 operates may be stored on a tangible and non-transitory (e.g., not a transient signal) computer readable storage medium, such as a memory 124. The memory 124 may include one or more computer hard drives, flash drives, RAM, ROM, EEPROM, and the like. Alternatively, one or more of the sets of instructions that direct operations of the monitoring module 110 may be hard-wired into the logic of the monitoring module 110, such as by being hard-wired logic formed in the hardware of the monitoring module 110.

As depicted in FIG. 1, the monitoring module 110 includes a physical analysis module 112, a cyber analysis module 114, a determination module 116, and a memory 124. The determination module 116 in turn includes a modeling module 118, an identification module 120, and a prognostic module 122. The embodiment depicted in FIG. 1 is intended as schematic in nature and is provided by way of example for illustrative purposes. It should be noted that, in various embodiments, one or more of the modules (or aspects of a module) depicted may be integrated into or with one or more other modules, and/or one or modules (or aspects of a module) may be split or subdivided into additional modules or additional sub-modules.

The depicted physical analysis module 112 is configured to receive physical diagnostic information from the sensor 156. The physical analysis module 112 may receive current and/or historical information. The physical diagnostic information may describe, depict, or otherwise correspond to an operational (or functional) and/or environmental state of the functional system 150. The physical diagnostic information may include current and/or historical information regarding the physical portion 152 of the functional system 150. The physical analysis module 112 may also be configured to determine physical analysis information using the physical diagnostic information. In various embodiments, the physical analysis module 112 may be configured to pre-process the physical diagnostic information. For example, the physical analysis module 112 may derive or otherwise determine a second parameter using information describing or corresponding to a first parameter obtained from the sensor 152. For example, the physical analysis module may determine a force from deformation information provided by a strain gauge.

It should be noted that certain computer related data of a functional system 150 may include information regarding cyber parameters such as process system data. Such parameters may define the semantics and behavior of an executing process, and thus may be understood as physical (or operational) diagnostic information as used herein, in that such parameters relate or correspond to an operational or functional state of the system. These parameters may, for example, describe or correspond to when a process was last run, how much central processing unit (CPU) time the process has accumulated, how much of that time was spent in a kernel mode, how much of that time was spent in a user mode, how much memory was used, or the like. Thus, while some cyber or computer information may be understood as cyber security data as used herein, other cyber or computer information may not be understood as cyber security data. By way of analogy, an example of a metal fence may be considered. The metal fence may rust to failure, or may be vandalized. While both may be considered "physical" failures, one is malicious (vandalism) and one is not (rust). Information describing vandalism or break-ins to the fence may be considered as security information, while information describing rusting of the fence or other wear and tear may be considered as health information. Similarly, some cyber information may describe cyber security data, while other cyber information may describe health of a system.

Because malicious and non-malicious behavior has differing goals or objectives, appropriate selection of features or parameters analyzed or used to construct a model may identify differences in the run-time behavior of malicious and non-malicious processes. Further still, because many malicious processes are a variation or evolution of previous versions, capturing process behavior at relatively low levels of abstraction may improve resilience to run-time evasion attempts and/or aid in developing detection schemes that may adapt to evolving attacks. As discussed herein, parameters not conventionally associated with cyber security detection schemes may be utilized to identify a state of a system. Further still, in various embodiments, parameters not conventionally associated with cyber security detection schemes may be used in conjunction with parameters related to cyber security to monitor and/or predict the physical health of a system and/or security from malicious attack. For example, in some embodiments, both health related information and security related information are considered in conjunction with each other to determine a health state and/or to prognosticate a future health or expected useful life of a system. Alternatively or additionally, in some embodiments both health related information and security related information are considered in conjunction with each other to determine a security state and/or to prognosticate a future security level or expected secure life of a system.

In various embodiments, the physical analysis module 112 may be configured to select a particular parameter or group of parameters to be used in developing physical analysis information to be provided to the determination module 116. For example, a model may be developed by the modeling module 118 that utilizes a group of parameters. The physical analysis module 112 may analyze the received physical diagnostic information, remove information corresponding to parameters or features not utilized by the model, and provide the remaining information to the determination module 116. In some embodiments, the physical analysis module 112 may not perform any pre-processing, filtering, selection, or the like, such that the physical analysis information is the same as the physical diagnostic information.

The cyber analysis module 114 in the illustrated embodiment is configured to obtain (e.g., via the communication link 140) cyber security data corresponding to the networking portion 154 of the functional system 150, and to determine cyber analysis information using the cyber security data. As used herein, the term "cyber" may be understood as pertaining to computers or networks. Cyber security data thus may relate in various embodiments to the security of information systems, computers, networks, or the like. Cyber security may also be understood in various embodiments as relating to information security. Cyber security attacks may include attacks such as viruses, spoofing, malware, or the like. Cyber security data may include results of a security scan performed by the functional system 150. Additionally or alternatively, cyber security data obtained by the cyber analysis module 114 may include raw data, metadata, programs, logs or the like.

In various embodiments, the cyber analysis module 114 may be configured to pre-process the cyber security data. For example, the cyber analysis module 114 may derive or otherwise determine a second parameter using information describing or corresponding to a first parameter obtained from the networking portion 154. In some embodiments, the cyber analysis module 114 may perform one or more security analysis (e.g., a scan for viruses, malware, or the like) to produce security scan results that may be provided as cyber analysis information to the determination module 116. Additionally or alternatively, the cyber analysis module 114 may be configured to select a particular parameter or group of parameters to be used in developing cyber analysis information to be provided to the determination module 116. For example, a model may be developed by the modeling module 118 that utilizes a group of parameters. The cyber analysis module 114 may analyze the received cyber security data, remove information corresponding to parameters or features not utilized by the model, and provide the remaining information to the determination module 116. In some embodiments, the cyber analysis module 114 may not perform any pre-processing, filtering, selection, or the like, such that the cyber analysis information is the same as the cyber security data.

In various embodiments, the cyber analysis module 114 may be configured to receive cyber security data describing, pertaining to, or otherwise corresponding to the communication link 140 and/or monitoring module 110 itself, so that security threats to the communication link 140 and/or the monitoring module 110 may be evaluated or assessed. Alternatively or additionally, one or more aspects of the monitoring module 110 may be configured at a different security level than one or more other aspects of the monitoring module 110. For example, the cyber analysis module 114 and/or the determination module 116 (or one or more aspects thereof) may be configured at a higher security level than the physical analysis module 112 to help prevent or reduce potential spoofing of cyber parameters or information by a comprised physical asset.

The determination module 116 is configured to obtain the physical analysis information and the cyber analysis information, to determine a state of the functional system 150 using the physical analysis information and the cyber analysis information, and to identify if the state corresponds to one or more of a non-malicious condition or a malicious condition. The determined state of the functional system 150 corresponds to at least one of the physical condition of the functional system 150 or cyber security threat to the functional system 150. As indicated above, the determination module 116 of the illustrated embodiment includes a modeling module 118, an identification module 120, and a prognostic module 122. The modeling module 118 is configured to develop one or more models for identifying a state and/or projected life for the functional system 150, the identification module 120 is configured to identify a state or condition of the functional system 150 (e.g., via the use of one or more models developed by the modeling module 118), and the prognostic module 122 is configured to project an estimated life of the functional system (e.g., via the use of one or more models developed by the modeling module 118).

The modeling module 118 is configured to develop one or more models to one or more of: determine a state of the functional system 150; determine how far along a given state such as a fault has developed; or determine how much life the functional system 150 is estimated to have remaining. Models may also be used to identify features of interest that may be used to determine the state or condition of a system (and/or to project an expected life of the system). Plural models may be combined, for example, by ensemble or fusion techniques. In various embodiments, historical data and/or running totals of parameters may be utilized to develop or modify models. In some embodiments, machine learning may be employed to develop one or more models. In various embodiments, one or both of physical or cyber information may be used to assess one or both of a physical or security state (and/or used to project one or more of an expected physical life or expected secure life). For example, in various embodiments a model may be used to identify a security threat via the use of physical parameters (either alone or in conjunction with cyber security data).

The modeling processes in various embodiments may be understood as including a number of steps. For example, a model may be developed by generating data, extracting features of interest, and then designing classifiers (or identifiers). In various embodiments, the generating of data may include collecting data and correlating the data to a known process being executed by a system (or saving the data for correlation to a subsequent identification of the process being executed). Data may be collected for both normal and malicious processes. The data may then be analyzed to determine one or more features or parameters that may be used to build a model to identify a particular process (or state associated with a process). Statistical descriptors and/or shapes associated with the data may be used to identify and/or extract features. Features may then be selected for use with one or more models. For example features which are observed to differ for various processes may be selected in conjunction with construction of a model, while features that tend not to differ for various processes may be discarded. The model is designed such that the selected features may be used to provide an output (a signature, chart, graph, or the like) used to distinguish the processes for which data has been generated.

An illustrative example is provided to illustrate a modeling process for identifying a state, condition, or process. The example is provided for illustrative purposes only, as, for example, a different number of parameters or features may be employed in various embodiments. In the illustrative example, a group of parameters defining or describing semantics and/or behavior of an executing process may be collected and analyzed using a time series analysis approach to identify and classify cyber-events. For example, four benign commands (identified as "A," "B," "C," and "D") and one malicious process (identified as "M") may be analyzed. Data is generated and collected for each of the commands or processes. For example, five repetitions of data for each process may be collected. An analysis of parameters (or features or values corresponding to the parameters) collected may be used to identify a sub-group of features that will be used for the modeling. For the purpose of simplification and ease of illustration, two features will be utilized in the present example. A scatter plot of the two features may be prepared.

Figure 2:
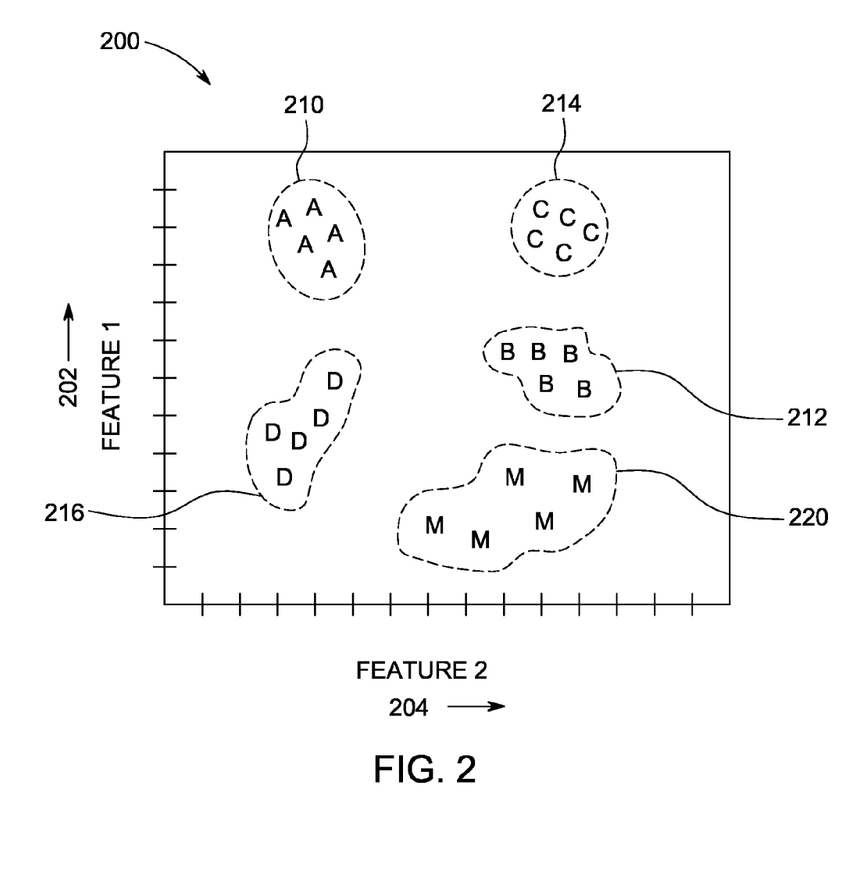
FIG. 2 is a scatter plot of results for various processes in accordance with various embodiments.

FIG. 2 illustrates a scatter plot 200 of two such features in accordance with an embodiment. The scatter plot 200 includes a first axis 202 corresponding to the first feature and a second axis 204 corresponding to the second feature. In the illustrated embodiment, each of the five repetitions for each process form a cluster. The results for process A form a cluster 210, for process B a cluster 212, for process C a cluster 214, for process D a cluster 216, and for malicious process M a cluster 220. Thus, for an unknown process yet to be identified, the location of the results of the unknown process for the first and second feature may be determined, and the type of process identified or determined based on the position of the result relative to the identified cluster. For example, if the result falls within a range defined by the cluster 220, the process may be identified as the malicious process M.

It may be noted that in practice more features may be required to differentiate processes, thereby requiring more complex graphing or charting, and that clusters for two or more processes may overlap requiring iterative use of one or more models and/or groups of features. For example, in some embodiments, clusters may overlap. For instance, three processes may be considered—a first process "X," a second process "Y," and a third process "Z." A first cluster may include results for some repetitions of X and some repetitions of Y, a second cluster may include results for the remaining repetitions of X and Y, and a third cluster may include results for repetitions of Z only. Thus, if a process being analyzed has results positioned within the first or second cluster, X and Y may not be immediately discernible from each other and further analysis may be required to specifically identify the process as either X or Y, but it may be ascertained that the process is not Z (or that there is a high likelihood the process is not Z).

Thus, parameters not used with conventional cyber security detection schemes may be utilized to identify a malicious process. In various embodiments, physical diagnostic information may be used additionally or alternatively to cyber security data. It should be noted that the example of FIG. 2 is provided by way of illustration and other modeling techniques may be employed.

Returning to FIG. 1, the depicted identification module 120 is configured to identify a state or condition of the functional system 150. For example, the identification module 120 may receive physical analysis information form the physical analysis module 112 and cyber analysis information from the cyber analysis module 114, and apply one or more modules from the modeling module 118 to all or a portion of the received information to determine a state of the functional system 150 based on the received information. The identification module 120 may be configured to identify a present state or condition and/or to determine how far along a given condition, for example, a fault, has progressed. In various embodiments, the identification module 120 may be configured to characterize a state or process as a fault or anomaly and/or to characterize a fault or anomaly as malicious or non-malicious. For example, a state or condition of the functional system 150 may be characterized as normal (e.g., operationally functional or substantially undamaged), characterized as a fault that is benign (e.g., bearing failure, normal wear and tear or the like), or can be characterized as a malicious fault (e.g., cyber attack). The state may also describe an amount or level of severity. For example, the state may correspond to an amount of wear (e.g., wear of a bearing or other physical component), or as another example, a threat level or a level of concern regarding potential cyber attacks. In some embodiments, a single state may be provided corresponding to one or more of physical and cyber state or condition. In other embodiments, a first state may be provided corresponding to a physical state and a different, second state may be provided corresponding to a cyber security condition or state.

In various embodiments, cyber threats may be considered as a subset of other faults or anomalies. In various embodiments, the identification module 120 may be configured to identify a physical state using both physical and cyber security parameters. Additionally or alternatively, the identification module 120 may be configured to identify a cyber security state using both physical and cyber security parameters. Utilization of both physical and cyber parameters by the identification module 120 provides the identification module with a more complete view of the entire context of a state of the physical system 150, thereby helping to improve the identification of state, the characterization of type of fault, the accuracy and reliability of prognostic estimates, and/or the identification of one or more remedial courses of action (as well prevention of future faults or cyber security threats). For example, a functional system or component of a functional system such as a programmable logic controller (PLC) may be spoofed in an attempt to evade cyber security measures. However, in various embodiments, the analysis of parameters corresponding to the operation of the PLC (in addition or alternatively to conventional cyber security parameters or analysis) may determine that an abnormal condition is being run and identify the abnormal condition as a security threat. For example, the abnormal condition may be identified via the use of one or more models based on historical data regarding the cyber attack and/or the normal operation of the PLC. For example, the analysis of parameters corresponding to the operation of the PLC may yield results substantially similar (e.g., falling within an identified cluster of a scatter plot) as a known malicious fault. As another example, the analysis of parameters corresponding to the operation of the PLC may yield results that are not substantially similar (e.g., falling within an identified cluster of a scatter plot) to any known normal operative processes of the PLC, and thus be identified as an abnormal condition. Once identified as an actual or potential security threat, or abnormal condition, an abnormal condition may, for example, be further analyzed to verify that the condition is indeed a fault, classify the condition as malicious or non-malicious, and/or determine a specific remedial countermeasure. Faults, for example, may be classified as benign or malicious using group-classification techniques, and the genealogy of a given fault classified using self-classification techniques.

The prognostic module 122 is configured to project one or more estimated life or lives of the functional system 150. For example, the prognostic module 122 may be configured to project a useful life based on physical information or parameters. Additionally or alternatively, the prognostic module 122 may be configured to project an expected secure life corresponding to a predicted time for which the functional system is expected to be free and/or secure from faults due to previous exposure to cyber attack. In various embodiments, being secure from faults due to previous exposure to cyber attack may be understood as being subject only to threats below a given threshold of threat level. In contrast, conventional systems may look at cyber attacks as step functions (e.g., a system is either entirely secure or effectively entirely comprised). Various embodiments provide an estimated remaining secure life, which may help avoid unnecessary shutdowns that may be avoided and/or delayed to a more convenient time in situations where a shutdown may not be necessary to deal with a detected cyber threat. Various embodiments provide a combined or aggregate estimate of remaining life based on both physical and cyber security data. For example, the prognostic module 122 may be configured to estimate plural lives based on a number of conditions and/or faults, and combine the plural lives for an overall estimated life, or, as another example, the prognostic module 122 may estimate plural lives based on a number of conditions and/or faults, and select the shortest estimated life as the system estimated life. Additionally or alternatively, in still further embodiments, the prognostic module 122 may estimate plural lives based on a number of conditions and/or faults, and may report the plural estimated lives individually, or may report a given estimated life or lives in response to a query requesting one or more particular estimated lives (e.g., for a given component or aspect or group of components or aspects of the functional system 150).

The prognostic module 122 in various embodiments employs a current state identified by the identification module 120 in conjunction with one or more models of projected future life provided by the modeling module 118 to determine an estimated life. In various embodiments, the estimated life may be a probabilistic estimate based on a current state and a projected development of condition or state (or a range defining the projected development). For example, a remaining useful life may be estimated based on a current state of wear of a part (e.g., estimated from a running total of time the part has been in service and the operating/environmental conditions over that time of service) as well as an estimate of future wear based on anticipated future operating/environmental conditions.

Further, various portions of cyber security data may be used to project a remaining secure life. For example, information corresponding to one or more of time since re-imaging (e.g., re-imaging of a hard drive), time since security check, time since re-booting, number of website visits, number of ports open/accumulated time of ports open, time on network, or the like may be used to project a remaining secure life from a known state of cyber security. Additionally or alternatively, a known timeline for an identified cyber threat may be employed to estimate a remaining secure life. For example, a known malicious fault may have various stages, such as payload introduction, command and control, footprint expansion, target identification, attack event, retreat and removal, or the like. Depending on which stage a malicious fault is at (and/or the relative threat posed by a given malicious fault), a time of remaining secure life may be determined. For example, if the fault is relatively lower in terms of potential damage and relatively early in a lifecycle, the estimated secure life remaining may be relatively longer. On the other hand, if the fault is relatively higher in terms of potential damage and relatively late in a lifecycle, the estimated secure life remaining may be relatively shorter. Further, in various embodiments, even if no present malicious fault is identified, a remaining secure life may be project based on, for example, the likelihood of a dormant, unidentified, and/or future intrusion of a malicious fault based on an amount of exposure (e.g., time on network, number of ports open, amount of information exchanged with one or more outside parties, or the like) and time since re-imaging. Further still, in various embodiments, if a fault is identified as malicious (or potentially malicious) and the particular type of fault is not identified, the prognostic module 122 be configured to provide an alert or alarm configured to call immediate attention to the fault and/or execute a shutdown or otherwise contain the unidentified threat without providing an estimated secure life remaining.

Figure 3:
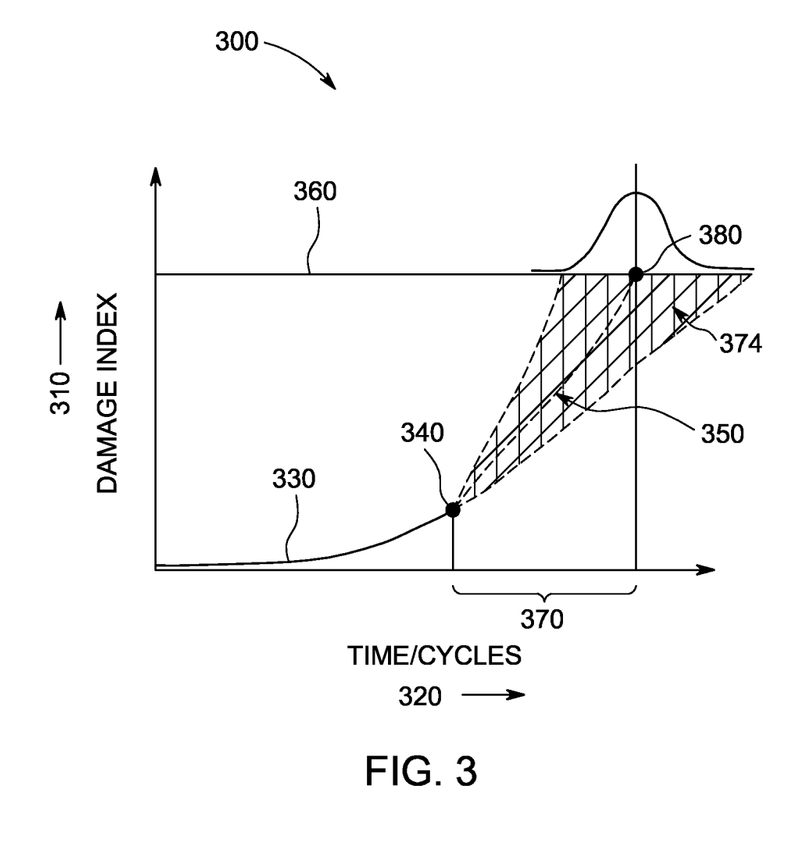
FIG. 3 is a schematic view of determination of an expected life in accordance with various embodiments.

FIG. 3 provides an example of prognostic projection in accordance with an embodiment. In FIG. 3, a remaining life curve 300 is depicted. The remaining life curve 300 is plotted along a damage index axis 310 and a time/cycle axis 320. The damage index axis 310 corresponds to a damage index (e.g., relative level of cyber security threat, amount of bearing wear, a composite damage index based on several measures of wear and/or security threat, or the like). The time/cycle axis 320 corresponds to an amount of time and/or number of cycles or other measure of duration experienced (or to be experienced) by a functional system. The first portion 330 of the remaining life curve leads from an initial or starting point to a current state 340. For example, the current state 340 may correspond to one or more current states or conditions identified by the identification module 120 using information corresponding to the functional system 150. The remaining life curve 300 includes a slope 350 leading from the current state. The slope 350 may be based for example on modeling based on historical wear or security level progression for an identified state or condition (or type of state or condition). When the remaining life curve 300 proceeds along the slope 350 to reach a threshold 360, the remaining secure life 370 is determined by subtracting the time/cycle corresponding to the current state 340 from the time/cycle corresponding to the intersection 380 of the remaining life curve 300 with the threshold 360. In the depicted embodiment, the intersection of the remaining life curve 300 is based on a center portion of a distribution 374. In various embodiments, the positioning of the intersection 380 and/or determination of the slope 350 may differ based on a particular wear, damage, and/or security condition. For example, if a particular fault or failure is of a severe or particularly unsafe nature, the intersection point may be moved to the left as depicted in FIG. 3 to provide for a shorter estimated remaining life.

By way of example, the remaining life curve 300 may correspond to a remaining secure life based on a security threat. In such an embodiment, the current state 340 may correspond to a detected security threat in an early stage, and the estimated remaining secure life may be based on an estimated future development of the security threat. The estimated development may be determined, for example, using a model based on historical data for similar security threats.

Figure 4:
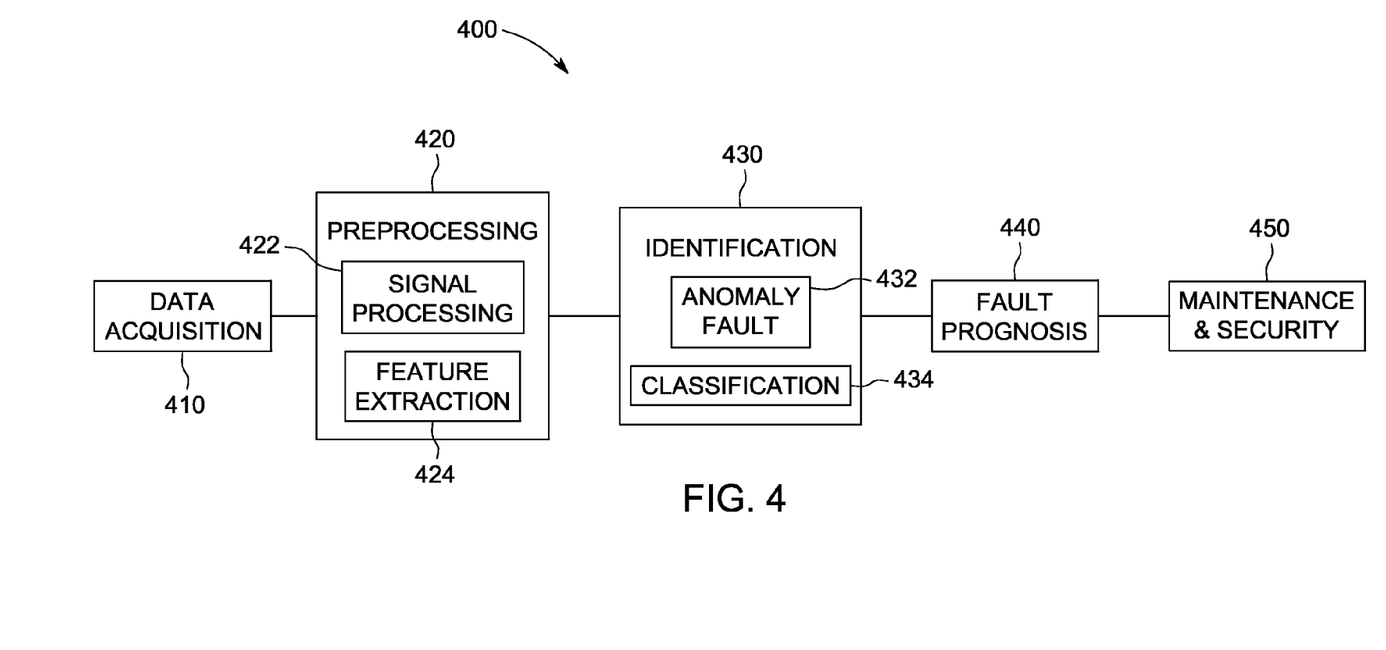
FIG. 4 is a schematic view of a monitoring module in accordance with various embodiments.

FIG. 4 provides a schematic view of a determination module 400 in accordance with one embodiment. The determination module 400 may be similar in certain respects to the determination module 110 discussed herein. In the embodiment depicted in FIG. 4, the determination module includes a data acquisition module 410, a preprocessing module 420, an identification module 430, a fault prognosis module 440, and a maintenance and security module 450.

The data acquisition 410 module is configured to obtain data. The data acquisition module 110, for example, may receive physical information from one or more sensors or detection channels associated with a functional system, as well as cyber security data of the system. In various embodiments, the data acquisition module 410 may be configured as a single module that obtains both physical and cyber information, or, in other embodiments, may be configured as two modules (e.g., similar in certain respects to the modules 112, 114 discussed herein). Data from the data acquisition module 410 in the illustrated embodiment is obtained by the preprocessing module 420.

In the illustrated embodiment, the preprocessing module 420 includes a signal processing module 422 and a feature extraction module 424. The signal processing module 422 may be configured to process received data, for example, to remove noise and/or filter undesired portions of a received signal including physical and/or cyber data. The feature extraction module 424 may be configured to identify and extract features that have been identified as pertinent or relevant to an analysis to be performed. For example, the features to be extracted may be identified based on a model (e.g., a model developed by a modeling module such as modeling module 118). Information corresponding to the extracted features may then be provided to the identification module 430.

The depicted identification module 430 is configured to identify a current state or condition of a system. In the illustrated embodiment, the identification module 430 includes an anomaly fault module 432 and a classification module 434. The anomaly fault module 432 is configured to detect an anomaly or fault, for example, via the use of a model. For example, a measure, comparison, combination, or the like of a number of parameters (physical, cyber, or both) corresponding to a detected state may be compared to corresponding measures, comparisons, combinations, or the like of known conditions or faults to determine if a detected state is a normal condition or a fault. The classification module 434 is configured, for example via the use of a model based on historical information, to classify a given detected fault. The classification module 434 may classify the fault as either malicious or non-malicious, and/or may identify the fault as a particular specific fault or belonging to a particular group, family, or type of fault.

The fault prognosis module 440 is configured to provide an estimated life or lives for one or more aspects of the system being analyzed. For example, the fault prognosis module 440 may provide one or more of a remaining useful life based on a remaining secure life. The estimated life may be projected, for example, using a model as discussed herein. For example, an estimated secure life may be projected from a current level of security threat using a model that uses both physical and cyber information or data as inputs. The estimated life (or lives) are provided in the illustrated embodiment to the maintenance and scheduling module 450. Based on both the type of fault (or faults identified) as well as the estimated life (or lives remaining), the maintenance and scheduling module 450 may identify both an appropriate corresponding remedial action (or actions) and time (or times) to perform the remedial action(s). Remedial actions may address physical (benign) and/or cyber security (malicious) faults, and may include one or more of replacement of a part, repair or re-furbishing of a part, shutdown of a system, re-imaging of one or more aspects of system, use of anti-malware software, or the like.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units may be combined, a given module or unit may be divided into plural modules (or sub-modules) or units (or sub-units), a given module or unit may be added, or a given module or unit may be omitted.

Figure 5:
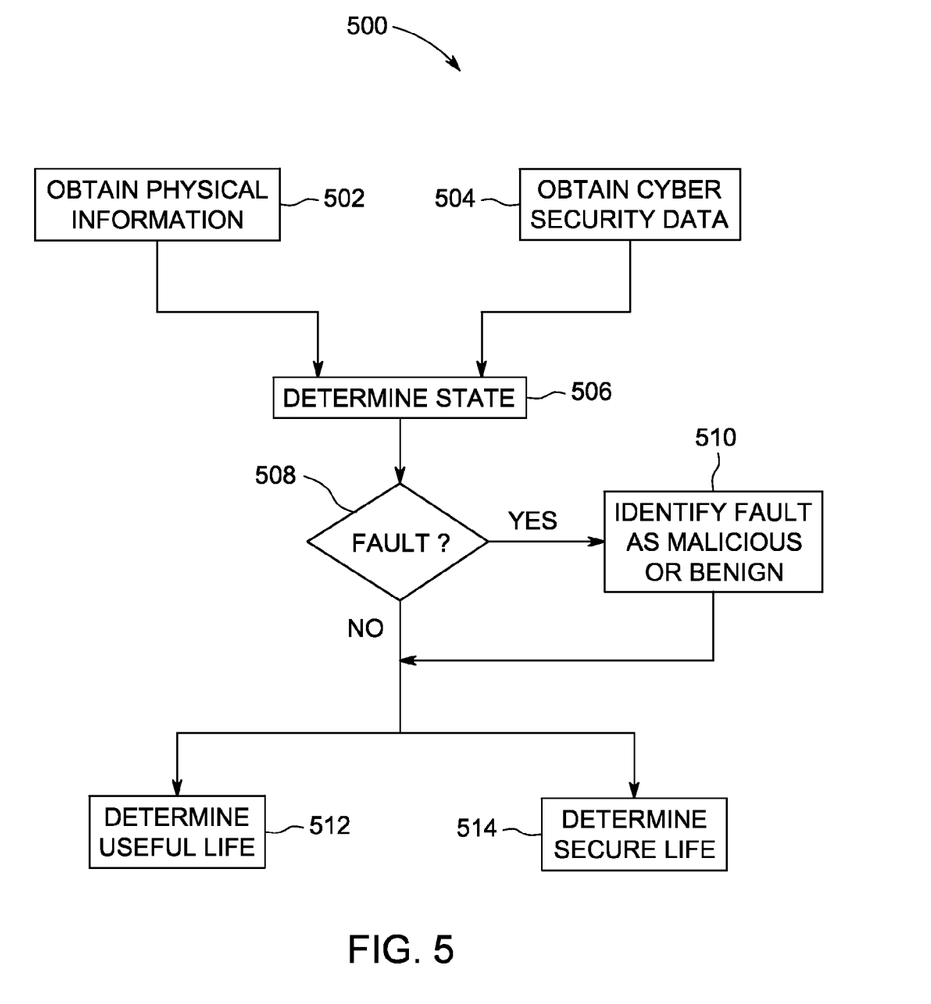
FIG. 5 is a flowchart of a method for remote monitoring, security, and prognostics in accordance with various embodiments.

FIG. 5 provides a flowchart of a method 500 for analyzing or assessing the security and/or health of a system in accordance with an embodiment. The system to be analyzed may be one or more of a functional system, an information system (for example, an information system configured to operate in conjunction with a functional system), or the like, and may include a number of sub-systems. In some embodiments, a first system configured to perform monitoring of a second system, and/or a communication system communicatively coupling the first and second systems, may be analyzed as well. In various embodiments, the method 500, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 502, physical diagnostic information is obtained. For example, the physical information may be obtained from one or more sensors or detection channels associated with one or more physical aspects or portions of a functional system, and/or associated with operation of the functional system. In some embodiments, the information may be obtained via a cloud networking arrangement. The information may be obtained in some embodiments by a processing module such as the monitoring module 110 described herein (e.g., via the physical analysis module 112 of the monitoring module 110). The physical diagnostic information may describe, for example, one or more operational states (e.g., speed, force, deformation, voltage, current, or the like) of a physical component and/or one or more environmental states (e.g., temperature, pressure, humidity, or the like). The physical diagnostic information may also include parameters that define the semantics and behavior of an executing process of a portion, aspect, or component of the functional system.

At 504, cyber security data is obtained. In some embodiments, the cyber security data may be obtained via a cloud networking arrangement. The cyber security data may be obtained by a processing module such as the monitoring module 110 described herein (e.g., via the cyber analysis module 114 of the monitoring module 110). For example, the cyber security data may be obtained from a functional system and correspond to a networking or information exchange portion of the functional system. Alternatively or additionally, the cyber security data may be obtained from a monitoring system or module (e.g., the monitoring module 110) and/or a communication module (e.g., communication link 140), and correspond to the monitoring system or module and/or the communication module.

At 506, the state of the system being analyzed is determined. The state may describe or correspond to a level or condition of physical wear or damage and/or a level of cyber security threat. The state of the system in various embodiments is determined by a processing module (e.g., the monitoring module 110) using both physical information obtained at 502 and cyber security data obtained at 504. For example, various parameters obtained at 502 and 504 may be input to one or more models to determine or identify the state. One or more states or conditions may be determined for a system on an entire system basis, and/or may be determined for individual components of the system, groups of components of the system, sub-systems of the system, or the like.

At 508, it is determined if one or more of the states determined at 506 correspond to a fault. The determination may be performed (e.g., by a processing module such as the monitoring module 110 described herein) via one or models based on information received at 502 and/or 504 (or portions of the information and/or information derived from all or a portion of the information received at 502 and/or 504). If no state is determined to correspond to a fault, the method 500 proceeds to 512. If a fault is determined, the method proceeds to 510, where the fault is identified as malicious or benign. Further, a particular fault or type of fault may be identified. Depending, for example, on the particular fault identified (or developmental stage of the fault), a remedial action may be identified and performed on the system or portions of the system affected by or corresponding to the fault. Depending on the level of severity or timing of anticipated severity of the fault, such remedial action(s) may be scheduled for performance at a future time.

At 512, a useful remaining life is determined. The remaining useful life may be determined by a processing module such as the monitoring module 110 (e.g., via the prognostic module 122 of the monitoring module 110), and may be determined using a model utilizing one or more physical parameters and/or one or more cyber parameters. In some embodiments, the remaining useful life may correspond to an expected useful life before failure of a given component or aspect of a system. For example, a current state of wear of a bearing may be used as a starting point, with additional wear projected based on anticipated operating and/or environmental conditions expected to be encountered by the bearing. The progression of the wear to a given threshold (or the probability of reaching the given threshold at a given time) corresponds to a projected end of life from which an estimated useful remaining life may be determined. A maintenance and/or replacement activity may be scheduled based on the remaining useful life determined at 512.

At 514, a remaining secure life is determined. In various embodiments, the remaining secure life describes or corresponds to a time for which the system being analyzed is expected to be free from faults due to previous exposure to cyber attack. The remaining useful life may be determined by a processing module such as the monitoring module 110 (e.g., via the prognostic module 122 of the monitoring module 110), and may be determined using a model utilizing one or more physical parameters and/or one or more cyber parameters. A maintenance activity (e.g., re-imaging of a hard drive) may be scheduled based on the determined remaining secure life. In various embodiments, an aggregate or combined remaining life based on a remaining useful life and remaining secure life of one or more components may be determined.

Thus, various embodiments provide for the analysis of cyber security as an integrated aspect of monitoring of physical systems and/or components. In various embodiments, malicious attacks are analyzed as a subset of faults incurred by information systems. Further, various embodiments provide for cyber-security prognostics to help assess the cyber security of a system and/or assess remaining secure life of a system. Various embodiments provide for new techniques for detecting malicious breaches, for example using parameters conventionally associated with the assessment of a physical health of a system in conjunction with cyber security data. Various embodiments may be utilized in conjunction with adaptive resilient networks. For example, one or more of shared situational awareness, resiliency, or trust metrics may influence the degree of utilization of or response to diagnostic information or life projections in various embodiments.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:
1. A system comprising:
a physical analysis module of hardware and software, the hardware including one or more sensors to detect a parameter corresponding to an operational or environmental state of a functional system to obtain physical diagnostic information describing at least one of the operational or environmental states of the functional system, and further determine physical analysis information using the physical diagnostic information;
a cyber analysis module of hardware and software comprising a communication link to a networking portion of the functional system to obtain cyber security data, and to determines cyber analysis information using the cyber security data;

a determination module of hardware and software that provides one or more models to identify a state of the functional system and an estimated life of the functional system, wherein the expected life is an expected secure life corresponding to a predicted time for which the functional system is expected to be secure from faults due to previous exposure to cyber attack, such that the determination module obtains the physical analysis information and the cyber analysis information, to determines a state of the functional system using the physical analysis information and the cyber analysis information, the state corresponding to at least one of physical condition or cyber security threat, and to identify if the state corresponds to one or more of a non-malicious condition or a malicious condition; and a non-transitory computer readable storage medium including memory;

wherein the cyber analysis module is configured at a higher security level than the physical analysis module; and the one or more models is based on historical information corresponding to the physical diagnostic information and the cyber security data.

2. The system of claim 1, wherein the model is constructed using machine learning techniques.

3. The system of claim 1, wherein the cyber analysis module obtains the cyber security data via a cloud network structure.

4. A method comprising:

obtaining, via one or more sensors, physical diagnostic information describing at least one of an operational or environmental state of a functional system and further determining physical analysis information using the physical diagnostic information;

obtaining cyber security data corresponding to a networking portion of the functional system to determine cyber analysis information using the cyber security data;

obtaining, at a processing module, the physical diagnostic information and the cyber security data;

determining, at the processing module, a state of the functional system using the physical analysis information and the cyber analysis information, the state corresponding to at least one of physical condition or cyber security threat; and identifying, at the processing module, if the state corresponds to one or more of a non-malicious condition or a malicious condition;

further comprising determining, at the processing module, an expected life for the functional system using at least a portion of the cyber security data, wherein the expected life is an expected secure life corresponding to a predicted time for which the functional system is expected to be secure from faults due to previous exposure to cyber attack;

wherein the step of obtaining the cyber security data is performed at a higher security level than the step of obtaining the physical diagnostic information; and further accounts for historical information corresponding to the physical diagnostic information and the cyber security data.

5. The method of claim 4, wherein the model is constructed using machine learning techniques.

6. The method of claim 4, wherein the physical diagnostic information and the cyber security data are obtained via a cloud network structure.

* * * * *